Figure 1:
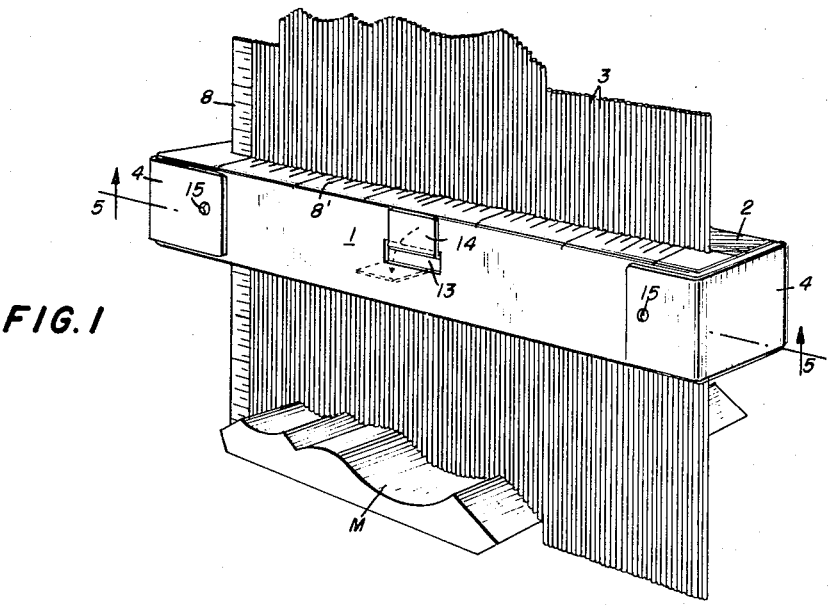

Aug. 23, 1960

M. L. WEXLER 2,949,674

CONTOUR GAUGE

Filed Oct. 1, 1957

4 Sheets-Sheet 1

INVENTOR
MONROE L. WEXLER

BY
ATTORNEYS

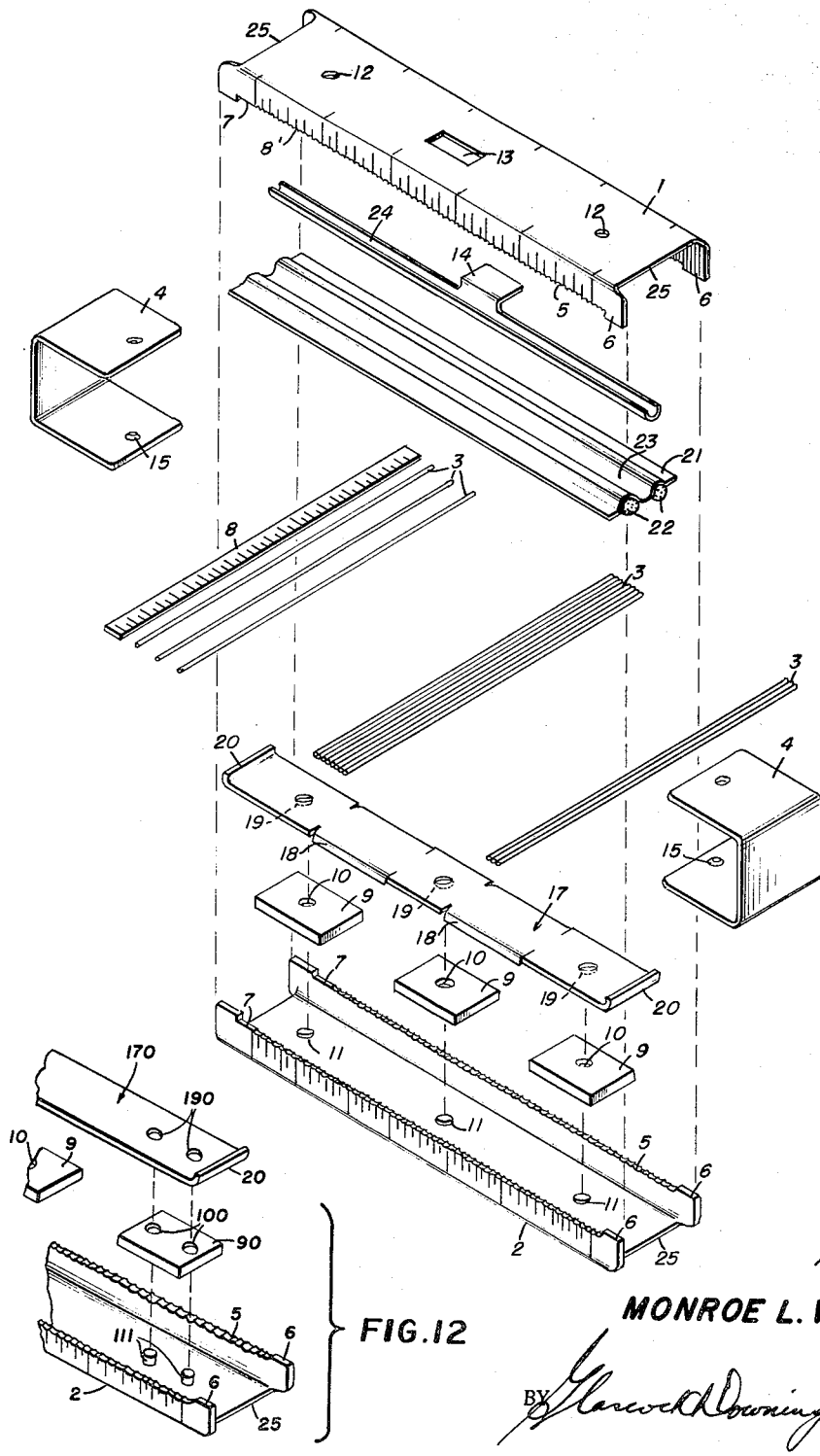

Aug. 23, 1960 M. L. WEXLER 2,949,674
CONTOUR GAUGE
Filed Oct. 1, 1957 4 Sheets-Sheet 3

INVENTOR
MONROE L. WEXLER

ATTORNEYS

Aug. 23, 1960     M. L. WEXLER     2,949,674
CONTOUR GAUGE

Filed Oct. 1, 1957     4 Sheets-Sheet 4

INVENTOR
MONROE L. WEXLER

ATTORNEYS

United States Patent Office 2,949,674
Patented Aug. 23, 1960

2,949,674

CONTOUR GAUGE

Monroe L. Wexler, 1321 Spruce St., Philadelphia, Pa.

Filed Oct. 1, 1957, Ser. No. 687,420

24 Claims. (Cl. 33—175)

The present invention relates to a gauge device, more particularly to an improved gauge used to obtain duplicate contours, that is, an accurate outline of the contour of irregular surfaces, for the purpose of reproducing such surfaces for fitting, matching, and other uses.

The invention further relates to that type of contour gauge in which a plurality of rod members of uniform length are slidably arranged in side by side relationship under a common frictional restraint in a holder or frame means whereby when the ends of the rods are pressed against an irregular surface, such as a piece of molding, by moving toward that surface, the contour of the surface will be duplicated.

In contour gauges of this type, the frictional restraint is that medium or material which links the holder, through which pressure is commonly applied, with the plurality of rods that are to be actuated separately. This frictional restraint must be such as to first grip each rod sufficiently to overcome opposing friction and draw it to its prescribed stopping point, and thereafter during continued movement of the holder the medium slides along each stopped rod until the last rod has reached its stopping point.

In contour gauges of this character, the gripping capability of the material which applies a frictional restraint governs the accuracy of duplication whereas the ease of operation is contingent upon the sliding capability. These characteristics are generally and inherently counter to each other in frictional restraint materials and can be reconciled only by a compromise of both capabilities to such degree as to limit the effectiveness of the gauge.

The materials such as rubber, felt, cork, leather, plastic and bodies of a similar nature which have been proposed in the prior art for use in a holder to apply frictional restraint to the rods are not only deficient with respect to combined gripping and sliding capabilities, but are also subject to wear, settling or packing, contamination, aging and like deterioration which adversely affects the proper and consistent functioning of the gauge.

It is required that a frictional restraint material such as rubber, felt, cork, leather, plastic and the like be pressed against the rods to a sufficient degree to render its gripping capability effective and therefore due to the compression so exerted on the rods, the unbraced span of the holder or frame means which in turn supports the rods will bow out or be deformed outwardly through its central portion and thus reduce pressure and resultant gripping capability therein to a lesser degree than is required, unless the holder or frame means provided is rigid enough to withstand such pressure without deforming.

It is, therefore, an object of the present invention to provide a contour gauge of the type incorporating a plurality of rods arranged in side by side relationship in a holder or frame means and in which means are provided to adequately establish the requisite frictional restraint functions and which means are relatively non-wearing and functionally not affected by contaminating agents or the other conditions which deleteriously affect frictional restraint materials generally, and which means do not require the application of pressure to ensure effective gripping capability nor holder structural provisions to withstand such stress.

It is a particular object of the present invention to provide a contour gauge of the type in question with means operably associated with the holder for applying magnetic attraction to rods of steel or other magnetically susceptible composition, to such degree as to provide a strong gripping action in drawing each rod to its prescribed stopping point, and a relatively weak resistance to continued movement of the holder or frame means thereafter, so that the gauge is both accurate and easy to operate, permanently consistent, not susceptible to wear or other conditions which would deleteriously affect the functioning of frictional restraint materials generally and is of relatively light construction, because magnetic restraint does not require applied pressure to be effective, and structural provisions to withstand stresses produced by applied pressure are unnecessary.

It is a further object of the invention to provide a contour gauge which includes in combination with a plurality of rods assembled in side by side relationship, a locking means whereby after duplication has been obtained, the rods may be quickly and easily immobilized without establishing conditions or forces during locking which tend to move or displace the rods either longitudinally or transversely of their axes so that the duplicate contour determined by the locked position of the rods can thereafter be transcribed or used directly as a template without disturbing the contour and locked relationship of the rods. In other words, the locked rods are immobilized without disturbing the contour taken and when used in locked position they are subjected to such a locking restraint that they will not deviate from the contour taking position.

It is another object of the invention to provide a contour gauge of the type including a plurality of rods of steel or other magnetically susceptible composition supported in side by side relation between complementary holding members, means operably associated with one of said holding members for applying magnetic attractive force to the rods in a direction normal to their axes and means operably associated with the other of said holding members for locking the rods in position after a contour has been duplicated.

An additional object of the invention is to provide a contour gauge of the type concerned in which the rods are of rectangular section, with the larger faces in side by side relationship and in which like magnetic charges are induced which cause them to repel each other and so substantially reduce contact friction which would otherwise oppose independent rod movement.

It is a still further object to provide deformed ends for rectangular rods which, not only prevent complete withdrawal of the rods from between the holder members but also minimize frictional interference between adjacent rods due to any existing burr formations in the metal at the ends of the rods.

As a still further object, when rectangular type rods are used, the invention provides for minimum frictional interference between contacting surfaces of adjacent rods by grooving or ridging one mutually contacting surface of adjacent rods.

A further object is to provide a contour gauge of the type concerned in which the rods are of round section, and in which the holder means utilized to apply magnetic attractive force are grooved to conform to a substantial portion of the periphery of each rod, thereby providing sufficient contact area to conduct the required attractive force from said holder means to the rods.

It is a still more particular object of the invention to provide a contour gauge of the type concerned with vertical and horizontal scales positioned and arranged in such manner that the dimensions of the duplicated contour can be readily obtained by direct reading, the horizontal scale being incorporated on the holder and the vertical scale of magnetically susceptible composition being actuated magnetically in conjunction with the rods in the course of contour making and in which the vertical scale is immobilized by the actuation of the same locking means that immobilizes the rods after a contour has been taken.

It is an additional object of the invention to provide an improved arrangement for supporting one or more permanent magnets in a holder or frame means in a definite or precise arrangement while eliminating the need for conventional securing means, such as adhesives, rivets or the like.

In connection with the aforegoing object, the invention provides an easily assembled relationship in which a metal frame member, magnets and a center pole bar for distributing the magnetic attractive force are held together magnetically.

It is also an object of this invention to provide an inexpensive, readily manufactured contour gauge of the type concerned.

In connection with the accompanying drawings and following description, other modes of applying the inventive principles may be employed, change being made as regards the details described and illustrated, provided the features stated in any of the appended claims or the equivalent of such features are utilized.

Figure 5:
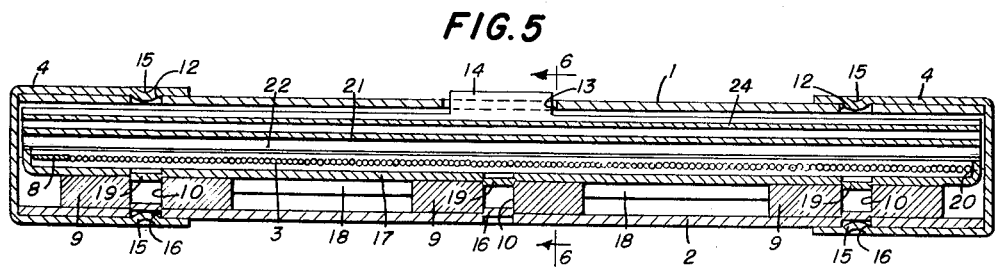
Figure 6:
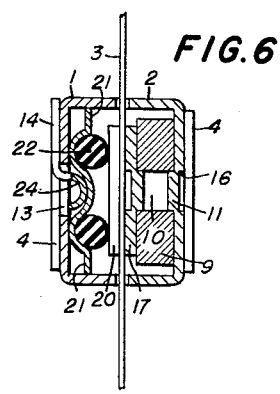
Figure 7:
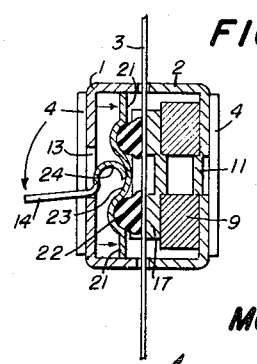
Figure 3:
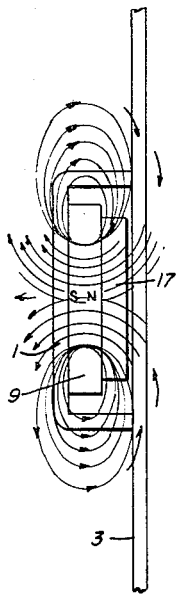
Figure 9:
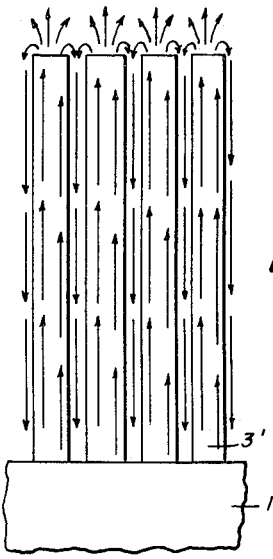
Figure 4:
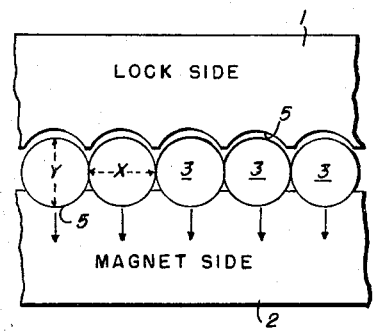
Figures 10, 11:
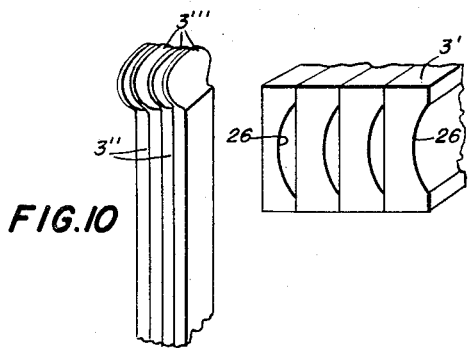
Figure 8:
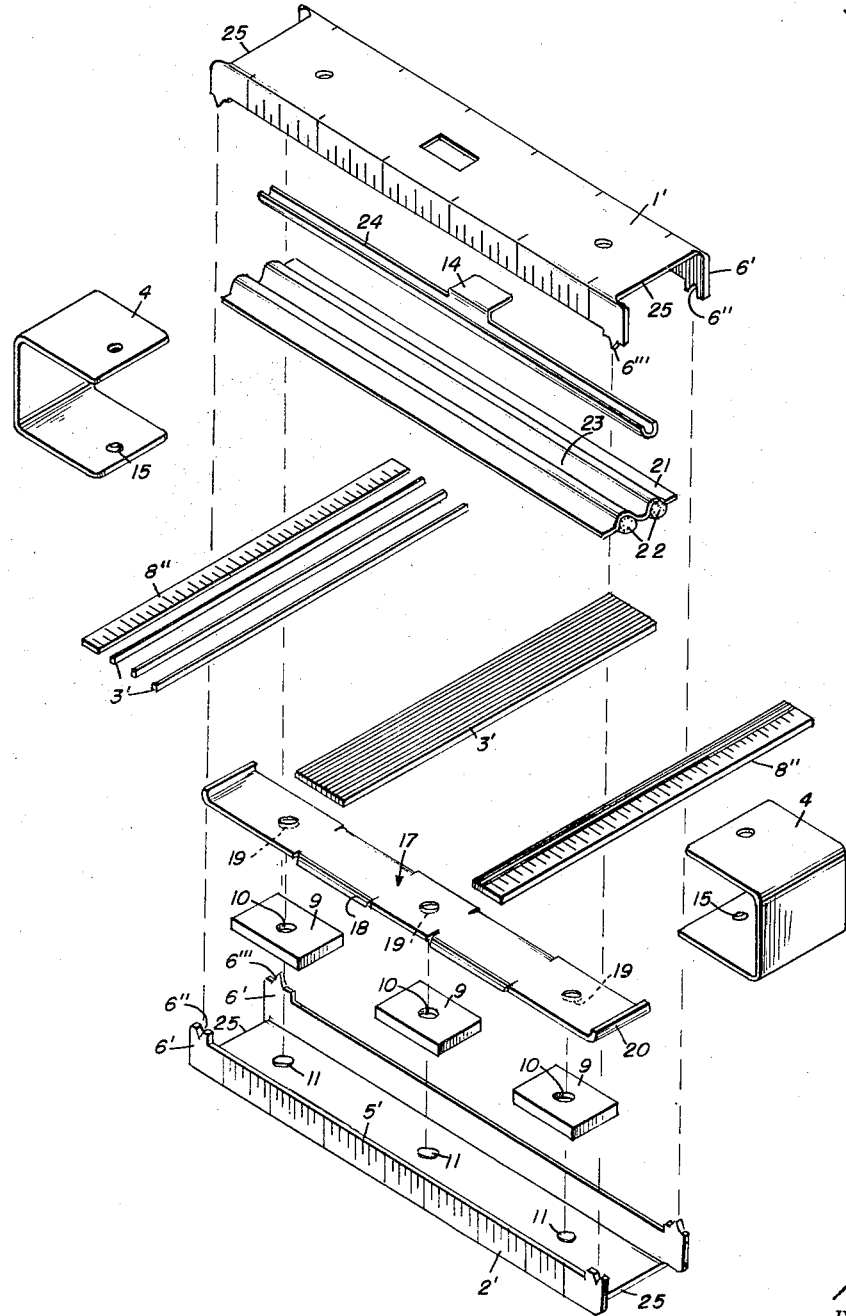

Further and more specific objects will be apparent from the following description taken in connection with the accompanying drawings in which:

Figure 1 is a perspective view illustrating one form of the invention in use,

Figure 2 is an exploded perspective view illustrating the component parts of the device shown in Figure 1 with particular reference to a gauge utilizing round rods, Figure 3 is a fragmentary view diagrammatically illustrating the magnetic lines of flux, Figure 4 is a fragmentary end view on an enlarged scale illustrating the relationship of round rods in the grooves in the associated holder members, Figure 5 is a cross-sectional view on an enlarged scale taken longitudinally through the holder means along lines 5—5 of Figure 1, Figure 6 is a transverse cross-sectional view illustrating the components prior to locking and taken along line 6—6 of Figure 5, Figure 7 is a view similar to Figure 6 but showing the components with the rods locked after duplication of a contour, Figure 8 is a view similar to Figure 2 by illustrating a modified form of gauge utilizing rods of rectangular section, Figure 9 is a fragmentary view of assembled rectangular rods shown on a greatly modified scale and diagrammatically illustrating the lines of induced magnetic flux and resultant repellant effect, Figure 10 is a perspective view of one of the deformed ends of a rod of rectangular section, Figure 11 is a fragmentary end view on an enlarged scale illustrating a partial assembly of rods of rectangular section modified to minimize friction between mutually contacting surfaces, and Figure 12 is a fragmentary exploded perspective view illustrating a modified form of magnet positioning means.

Figure 1 illustrates one form of contour gauge constructed in accordance with the present invention, and Figure 2 illustrates the component parts of this form of invention. The gauge incorporates a holder or frame structure consisting of two complementary frame elements 1, 2 each of which is U-shaped in cross-section, so that the respective frame elements are channel-shaped.

A plurality of round rods 3 are provided for mounting between frame members when they are in facing relation. End clips 4 secure the frame elements and the components within the same in assembled relation. Frictional restraint means for applying magnetic attractive force to the rods as described hereinafter are associated with the frame element 2 and contour maintaining or locking means are associated with the other frame element 1.

The side edges of each channel member 1, 2 are provided with grooves 5 for accommodating the rods 3. In one practical embodiment, Figure 4, the rods 3 are round and have a diameter $x$ of .030 inch. The grooves 5 provided in the facing edges of the respective holder elements are spaced apart on centers .030 inch laterally of the respective frame elements so that the rods contact each other while the opposite end portions of the sides of the channel-shaped frame elements project above the tops of the grooves to form spacers 6 so that when the two channel-shaped frame elements are placed on top of one another diametrically opposite portions of the aligned grooves in the respective frame elements are .036 inch apart, as shown at $y$, whereby the rods are in effect freely slidable through the channels provided by the main grooves. As viewed in Figures 1 and 2, the left-hand end of the side edges are cut to form flat surfaces 7, which accommodate a ruled strip 8 which has a thickness of .030 inch.

The bottom channel-shaped frame element 2, Figures 2 and 5 is provided with three slugs 11 protruding from its inner surface as a result of the metal of the frame element 2 being punched partway through. The other channel-shaped frame element 1 is provided with two apertures 12 coinciding with the position of the two end slugs 11 when the channel members are superposed, see Figure 5. The frame element 1 is also provided with a slot 13 in its central portion for accommodating the finger manipulating end piece 14 of the contour maintaining means described hereinafter.

The respective end clips or caps 4 are U-shaped channel elements having detent dimples or projections 15 on the interior thereof for cooperation with the depressions 16 underlying the opposite end slugs 11 and the holes 12 in the respective frame elements, see Figure 5. The end clips or caps must have spring temper and be preferably of non-magnetic susceptibility, such as tempered aluminum or a stainless steel alloy that is non-magnetic.

The frame element 2, center pole bar 17 described hereafter and the rods 3 are required to be made of steel or other magnetically susceptible composition. The other frame element may or may not be of steel.

Since the invention proposes magnetic attractive force as the frictional restraint medium, one or more magnets are to be associated with one of the holder or frame elements. The number, size and disposition of magnets will vary according to requirements. In the example illustrated in Figures 1 and 2 and shown in section in Figure 5, three magnets 9 are utilized and each magnet is centrally apertured as at 10. The magnets 9 are permanent magnets preferably of the ceramic wafer type of barium carbonate and iron oxide, and are so resistant to demagnetization that after the application of a demagnetizing field sufficient to reduce the flux to zero, the magnet will recover and have essentially the same magnetic characteristics as when orginally magnetized. Magnets of this type cannot be demagnetized unless heated above 460° C., a property which ensures relative permanency and consistency in the gauge.

As has been stated previously, the present example utilizes three permanent magnets. If two or more magnets are assembled in a channel-shaped element or member in mutual spaced relation, the magnetic attraction would not be uniform throughout the longitudinal extent of the holder or frame. Accordingly, the invention also contemplates a single elongated magnet mounted in channel element 2 and extending the full length thereof.

However, since the illustrated form incorporates three magnets and also in instances where plural magnets are used, regardless of the number and spacing between the magnets, it is necessary to utilize a center pole bar 17. This bar 17 distributes the magnetic attractive force throughout the longitudinal extent of the frame so that it is uniformly applied against all of the rods 3. In addition to distributing the magnetic force, bar 17 also functions to maintain the magnets in the position in which they are assembled and secured by slugs 11. The corners and edges of the magnets must be kept out of contact with the sides of channel member 2 otherwise the magnetic circuit would be short-circuited. Since magnets 9 have a transverse dimension less than that between the sides of channel member 2, some means must be provided to prevent these magnets turning about the axis of slugs 11. Accordingly, bar 17 is provided with integrally formed and bent down detents or flanges 18 engaging the opposite end surfaces of the center magnet and the adjacent end surfaces of the two end magnets. To ensure this cooperation, the undersurface of bar 17 is provided with slugs 19 similar in size and positioning to slugs 11, Figures 2 and 5. It is believed clear that the magnets, when assembled in this relation, and as shown in Figure 5, are maintained in a position whereby they cannot turn and are kept out of contact with the sides of the channel element 2.

Additionally, the sub-assembly of channel element or holder member 2, magnet or magnets 9 and center pole bar 17 can be readily assembled and once assembled are held together magnetically. The magnets are placed in the channel member 2 with the central apertures 10 thereof fitting over slugs 11. While these slugs can be dimensioned to have a press-fit relation with the apertures 10 such dimensioning is not necessary because close tolerances are not a factor. Thus a loose fit relationship facilitates assembly. When the magnets are in place in the channel member 2 with their side surfaces in alignment the center pole bar 17 is placed over the magnets with slugs 19 fitting in the other end of the apertures 10 and the detents or flanges 18 fitting between the ends of the center magnet and the two end magnets respectively, and the magnetic attractive force holds the center pole piece to the magnets and the magnets in turn to the holder member.

The details of the bar 17 illustrate a preferred structure, but the invention contemplates the utilization of any and all means which will properly position the magnets and simultaneously distribute and utilize the magnetic attractive force without employing additional holding or securing elements. Thus, as shown in Fig. 12, each magnet 90 could have two holes 100 therein and the bar 170 have two slugs 190 cooperating with each magnet and be a smooth, flat bar. Additionally, the magnets 100 are provided with elongated or oblong holes and the slugs 190 are similarly shaped. Broadly stated, the cooperating slugs 190, 111 and holes 100 in the respective bar 170, magnets 100 and channel element 200 can have any shape other than round whereby once the magnets are assembled, they will not turn and will be precisely positioned.

The bar 17 has upturned ends 20 that project toward the undersurface of channel member 1. Within channel member 1 is accommodated the contour maintaining or locking means which comprises three elements consisting of a pressure bar 21 comprising a shaped gutter member having two spaced channels therein, two gum rubber cords 22 each cemented in a channel in the gutter and in parallelism and an elongated lock-actuating cam 24. The gutter shaped member or lock pressure bar 21 coincides in length with the length of bar 17 so that as shown in Figure 5 the opposite ends of the rubber cords bear on the upturned ends 20 of bar 17 and are normally spaced out of contact with rods 3. The upper surface of gutter member 21 has a channel 23 between the two cords 22 that accommodates the U-shaped elongated cam 24 having the finger manipulating end piece 14 disposed centrally of its length and adapted to fit through the aperture 13 in channel member 1, see Figures 6 and 7. As shown in Figure 6 while a contour is being taken, the finger manipulating piece 14 lies flat against the top surface of channel element 1. After a contour has been taken and it is desired to lock the rods in that position, the finger manipulating piece is swung outwardly to a position shown in Figure 7, past 90° so as to press the pressure bar 21 toward the rods so that the rubber cords are deformed and engaged firmly against all of the rods simultaneously to lock them in position. It is to be pointed out that the edge of slot 13 toward which the end peice 14 is being moved is positioned to be engaged by end piece 14 after the latter has moved through an arc slightly more than 90° and stops the latter in locked position. When the end piece is moved back toward its original position, the resiliency of the pressure bar and rubber cords restore the parts to their initial assembled relationship with the cords again out of contact with the rods.

The contour holding or locking mechanism of the present invention is such that when being applied the rods are not subjected to any forces tending to displace them axially of their length or laterally of their position in the holder. In other words, with the gauge held vertical, the actuation of the lock does not apply any forces tending to displace the rods either horizontally or vertically from the position they assumed when a contour was taken.

In the utilization of the device, the holder or frame is held and the ends of the wires or rods 3 are placed against the contour to be duplicated. While magnetic attraction is strongest in the direction of the poles involved, it is weakest at an angle of 90° to that direction. Therefore, whereas the magnets apply great force to draw the rods toward the center pole bar, which distributes the magnetic force throughout the length of the frame, the rods can readily slide in the grooves 5 transversely of the face of the center pole bar. Therefore, with the holder being moved toward the object, such as a piece of molding M, Figure 1, the contour of which is to be duplicated, the respective rods independently reach their stopping points as determined by the shape of the object, whereupon the holder continues to be moved into contact with the highest point of the object. The ruled strip or scale 8 at one end of the group of rods can then furnish a direct reading of one dimension of the contour whereas a scale 8' marked on the top and side surfaces of the respective channel-shaped frame elements furnishes a direct reading of the other dimension of the contour.

If it is desired to transcribe the contour obtained in this fashion, it is obvious that the gauge must be moved and some tracing means applied against the ends of the rods in the positions assumed thereby when making the duplication. Since the rods must move readily in duplicating a contour they will also be displaced in the course of transcribing along the ends thereof unless means are provided to immobilize the rods. The present invention readily accomplishes this, since the manipulator of the gauge merely has to grasp the end of the finger grip 14 to cam the elongated cam member from the position of Figure 6 to that of Figure 7 whereupon the rubber strips are pressed firmly against the respective rods, so as to apply sufficient gripping force thereto to prevent their sliding lonigtudinally when the contour is being transcribed.

Figure 3 diagrammatically illustrates the magnetic lines of flux. In this figure the holder element 1, magnet 9 and center pole piece 17 are shown diagrammatically. It is further to be pointed out that the magnetic lines of flux shown in Figure 3 are equally applicable regardless of whether the rods are round or of other shape.

As indicated previously, the invention comprehends an arrangement utilizing rectangular rods. One form of such arrangement is particularly shown in Figure 8 wherein two channel-shaped frame elements 1', 2' are provided with smooth and flat rod accommodating surfaces 5' in contradistinction to being grooved. Instead of round wires, rods 3' in the form of flats having dimensions of .020 inch by .060 inch are used. In utilizing flats the same are assembled with their largest size in abutting relation and the facing surfaces of the channel-shaped frame elements are spaced .070 inch apart. In this form of the invention a ruled strip 8" that is also .060 inch in thickness is used at each end of the group of rods 3'. The opposite ends of the respective channel-shaped frame elements 1, 2 are provided with spacer projections 6'. One projection at each end being provided with a V-shaped notch 6" while the other projection at each end is provided with a complementary V-shaped projection 6'''. Thus, when the component parts are assembled, the respective notches and projections on the spacer element 6' cooperate to hold the frame elements in a definitely aligned superposed relationship. The end clips 4 are similar to those in the other illustrated form of the invention. The opposite ends of the respective frame elements in all forms of the invention are recessed as shown at 25 and the transverse dimensions of the end clips are less than that of the frame elements so that when the parts are assembled as shown in Figures 1 and 5 the intermediate portion of each end clip fits at least partway into the respective recesses 25 to ensure proper positioning and holding of the component parts together.

The form of the invention utilizing the flats or rectangular rods incorporates the same magnetic attractive force applying means and the same contour locking means as illustrated in Figure 2.

Figure 9 diagrammatically illustrates the lines of induced magnetic flux and resultant repellant effect. While this figure is greatly enlarged, the principles are applicable to all forms of the invention. In other words, the rods 3' shown on a greatly magnified scale have a tendency to be repelled away from one another because they have like induced magnetic charges so that the friction between the rods is minimized. This is especially applicable to the arrangement of Figure 8 wherein the flats are assembled with relation to smooth and flat surfaces.

In order to further minimize friction effects the rods can be shaped as shown in Figure 11 by having one surface of each rod grooved as at 26 so as to reduce to a minimum the facial contact area between adjacent rods.

Since it may be desirable to prevent withdrawal of the flats from between the frame elements, one manner of preventing this withdrawal is illustrated in Figure 10. Each end of each rod 3" is deformed such as by a press in such fashion that an enlarged head 3''' is formed. The dimensions of this head in relation to the largest dimension of the respective flat is greater than the space between the side edges of the channel-shaped frame elements. Further, with the deformation of the ends of the rods being effected by application of deforming pressure from one side only of the flat, the resultant burrs which would otherwise cause functional interference even though microscopic in nature will not affect the movement of the respective rods because when the rods are assembled in position there is sufficient space between adjacent heads 3''' to accommodate any such burrs. Thus, the heads 3''' will be offset to one side of the respective rods with one surface of the head lying in the same plane as the adjacent surface of the flat.

While the invention has disclosed utilization of round wires in one form and flat strips in another form, each form has certain advantages. From an overall economics aspect a gauge which uses round wires is cheaper to construct because the round wires are substantially cheaper than flat strips, especially if the strips have to be shaped. Furthermore, with round wires the holder elements being grooved will provide a larger surface contact for transmitting magnetic attraction between the holder element and the respective rods and this combined with the line contact between adjacent rods provides a relationship with minimum frictional resistance and maximum magnetic restraint. However, round wires do have a tendency to be deflected under conditions of stress or if the contour being duplicated is a slick surface such as glass, highly polished metal or the like. A gauge utilizing flat strips, while more expensive to manufacture, has two advantages in comparison with the round wire gauge. In one instance, the thinness of the flat strips enables the assembly of more individual strips in a gauge length for closer delineation of a contour and secondly since the strips are assembled with their larger faces in contact with one another any deflection under stress is minimized since the flats cannot ride over one another which action does occur when round wires are subjected to appreciable stress.

It is clear, therefore that the invention is not to be restricted to the use of round wires or flat strips but is directed to the broad aspect of incorporating magnetic force applying means within the frame or holder means of a contour gauge which accommodates a plurality of rods for sliding movement, regardless of the cross-sectional shape of the rods.

Another aspect of the invention embodied in this application is provided by the mounting means for positioning one or more permanent magnet elements comprising the combination magnetically held together of at least one apertured permanent magnet, a first bar having a slug or projection thereon for fitting within the aperture in the magnet and a second bar having a similar slug or projection thereon for fitting within the other end of the aperture in the magnet.

As indicated in the objects, the invention contemplates contour making with magnetic restraint. Therefore, a much longer gauge is possible utilizing the teaching of this invention without incorporating any massive or costly holding means. If a very elongated gauge is constructed locking means could either be eliminated or other side acting locking means devised which will preclude bowing of the frame when the lock is applied. Such side acting locking means could be of any type known in the art. In any event, locking means are not absolutely necessary in all instances so long as the gauge incorporates magnetic restraint and the portions of the holder elements accommodating the rods are maintained in uniform spaced relationship.

What is claimed is:

1. A contour gauge comprising a holder means, a plurality of magnetically susceptible rods of substantially uniform length slidably mounted side by side in said holder means and permanent magnet means operably associated with the holder means for applying magnetic attractive force to all the rods in a direction perpendicular thereto to attract all rods to the holder means with uniform force sufficient that when the holder means is moved toward an object the contour of which is to be duplicated the rods move with the holder means until individual rods abut the surface to be gauged whereupon those rods not yet in engagement with such surface continue to move with the holder means.

2. The contour gauge according to claim 1 wherein said permanent magnet means operably associated with the holder means is disposed upon one side of all the rods.

3. The contour gauge according to claim 1 wherein, said holder comprises a pair of substantially complementary holder members assembled in superposed facing relation, all said rods being slidably disposed between said members, lying in a common plane and having end portions projecting beyond said members, and said permanent magnet means is mounted in one of the holder members.

4. The contour gauge according to claim 3 further including rubber like strip means supported within the other one of the holder members to extend transversely over and in normal spaced relation to the opposite sides of said rods and means manipulable exteriorly of the holder for applying said rubber strip means against the rods after a contour has been duplicated to maintain the rods in contour duplicating position.

5. The contour gauge according to claim 4 wherein said rubber like strip means comprise a pair of rubber strip elements, a channel member having a pair of channels therein accommodating the respective strip elements and supported within said other holder member between the strip elements and the interior of said other holder member, said other holder member also having an aperture therethrough, an elongated cam element engaging said channel member on a side thereof opposite the strip elements and the means manipulable exteriorly of the holder comprising a finger manipulating member disposed through the aperture in said other holder member and operably related with said elongated cam element whereby actuation of said manipulating member cams said channel member toward the rods and thus applies said strip elements thereagainst.

6. The contour gauge according to claim 3 wherein said complementary holder members include facing edges spaced longitudinally along the axes of the rods, said rods being of circular cross section, and said facing holder member edges having closely-spaced aligned grooves of arcuate contour for accommodating said rods with substantial contact between said rods and the arcuate grooves of said holder members.

7. The contour gauge according to claim 3 wherein said permanent magnet means comprises a plurality of permanent magnets distributed along the interior of said one holder member, each said magnet having a bore therethrough, said one holder member having projections thereon fitting within one end of the bores through the respective magnets and a center pole bar extending over all of the magnets and having projections thereon fitting in the other end of the bores through the respective magnets for securing the magnets within the holder with the holder, magnets and bar being held together by magnetic force.

8. A contour gauge as claimed in claim 7 in which said center pole bar is provided with detent means engaging at least one end of each magnet to prevent movement thereof.

9. A contour gauge as claimed in claim 8 in which said center pole bar has opposite ends projecting outwardly of the bar in a direction opposite to the detent means and toward the other holder member, said ends being longer than the maximum transverse dimension of the rods, rubber like strip means within the holder extending over the rods and having opposite ends bearing on the ends of the center pole bar so that said rubber like strip means is normally spaced from the rods, a channel-shaped pressure plate accommodating said rubber like strip means, and cam means manipulable exteriorly of the holder means for camming said pressure plate toward said rods and thus said rubber strip means against the rods after a contour has been duplicated for immobilizing said rods.

10. A contour gauge as claimed in claim 3 wherein said rods are flat strips and said holder members have facing smooth surfaces spaced apart a distance slightly in excess of the major dimension of the flat strips.

11. The contour gauge according to claim 3 wherein the said holder members are assembled in facing relation by resilient means securing the members against transverse and longitudinal movements in relation to one another.

12. A contour gauge as claimed in claim 3 wherein said permanent magnet means comprises a plurality of permanent magnets distributed along the interior of said one holder member, a center pole bar extending over all the magnets, and cooperable projection and aperture means incorporated with the said one holder, magnets and center pole bar, to mount the magnets within said holder in a manner preventing movement thereof.

13. A contour gauge as claimed in claim 12 in which each magnet includes a plurality of apertures and the respective holder member and center pole bar include projections for interfitting cooperation with each aperture in each magnet.

14. A contour gauge as claimed in claim 12 in which the cooperable apertures and projections are non-circular.

15. A contour gauge comprising a pair of complementary, channel-shaped holder elements each having a base and opposite spaced sides, one of said holder elements having apertures through the base thereof adjacent its opposite ends, the other holder element being magnetically susceptible and partly punched in a direction toward the first holder element in alignment with the apertures in the base of the first holder element to provide projections on the interior of the base of said other holder element, a plurality of permanent magnets each having a bore therethrough and opposite flat surfaces, one magnet being mounted with one end of its bore fitting over the respective projections on said other holder element, a metal center pole bar partially punched in areas spaced along the bar corresponding to the spacing of the projections on said other holder element, so as to form similar projections on said bar, said bar being disposed over the magnets with the projections of the bar fitting in the other end of the bores through the respective magnets, at least the major extent of the sides of the holder elements when in confronting relation being spaced apart, a plurality of metal rods disposed in side by side relation between the confronting sides of the holder elements, whereby magnetic attractive force applies frictional restraint to the rods in a direction perpendicular thereto and holds the said bar, magnets and other holder element together, a pair of channel-shaped resilient clips each including two arm portions of a length adapted to fit over the opposite ends of the channel-shaped holder elements, the respective arm portions having protuberances formed thereon, each directed toward the interior of the clips and the protuberance on one arm of each clip fitting in the apertures through the base of said one holder element while the protuberances on the other arm of each clip fit in the depressions formed in the said other holder element that are opposed to the projections on said last mentioned channel element that are adjacent the opposite ends of that element so that relative movement of the channel elements is effectively prevented.

16. A contour gauge as claimed in claim 15 and further including rubber like strip means disposed interiorly of the holder elements and extending across the rods on the side opposite said center pole bar and means manipulable exteriorly of said one holder element for applying said strip means against the rods after a contour has been duplicated to maintain the rods in contour duplicating position.

17. A contour gauge comprising the combination of a pair of substantially complementally shaped holder members, a plurality of magnetically susceptible metal rods of substantially uniform length, means assembling said members in superposed facing relation, said rods being slidably disposed in side by side relation to lie in a common plane between said members and including end portions extending therebeyond, permanent magnet means mounted within one of said holder members on one side of the common plane containing the axis of all the rods and cooperably associated with all said rods to apply magnetic attractive force to all the rods in a direction perpendicular to the longitudinal extent of the rods to link the rods to said one holder member with force sufficient that when the assembled holder members are moved toward an object, the contour of which is to be duplicated, all said rods move with the holder members until individual rods abut the surface to be gauged, whereas, those rods not yet in engagement with such surface continue to move with the holder members until all the rods engageable with such surface have reached the position in contact therewith and the movement of the holder member is stopped, and movable locking means carried within said other holder member and extending tranversely across all said rods in normal spaced relation thereto and including manipulable means for moving the locking means into contact with all said rods after a contour has been duplicated to maintain such rods in contour duplicating position.

18. A contour gauge comprising a holder means, a plurality of magnetically susceptible rods of substantially uniform length slidably mounted side by side in said holder means, a permanent magnet structure operably associated with said holder means and including a permanent magnet, said permanent magnet structure having a pair of spaced apart terminal portion pole pieces extending transversely to the longitudinal axes of said rods, said terminal portion pole pieces being contiguous to each of said rods at two spaced apart regions along the lengths of the rods, whereby a low reluctance magnetic path is established between opposite magnetic poles of said permanent magnet structure by that portion of each of said rods lying between said pair of spaced apart terminal portion pole pieces of said permanent magnet structure.

19. A contour gauge as set forth in claim 18 wherein said pair of spaced apart pole pieces physically contact said rods at each of said two spaced apart regions along the rods' length.

20. A contour gauge as set forth in claim 18 wherein said pair of spaced apart pole pieces both extend from one magnetic pole of said permanent magnet.

21. A contour gauge as set forth in claim 18 wherein said pair of spaced apart pole pieces both extend from one magnetic pole of said permanent magnet and physically contact said rods at each of said two spaced apart regions along the rods' length.

22. A contour gauge as set forth in claim 18 wherein said pair of spaced apart pole pieces both extend from one magnetic pole of said permanent magnet, the opposite magnetic pole of said permanent magnet structure lying physically between said pair of spaced apart pole pieces and being physically spaced from said rods.

23. A contour gauge as set forth in claim 21 wherein said holder means is made of magnetically susceptible material and said permanent magnet is housed therewithin with one magnetic pole of said magnet in physical contact with said holder means, said spaced apart pole pieces comprising a part of said holder means.

24. A contour gauge comprising a holder means, a plurality of magnetically susceptible rods of substantially uniform length slidably mounted side by side in said holder means, a permanent magnet structure operably associated with said holder means and extending transversely to the longitudinal axes of said rods including a permanent magnet with the north to south magnetic axis of said permanent magnet being oriented transversely to the longitudinal axes of said rods, said permanent magnet structure including at least one magnetically susceptible pole piece, and said pole piece being contiguous to the side surface of said rods, whereby the magnetic flux of the permanent magnet travels through at least a portion of the length of said rods.

References Cited in the file of this patent

UNITED STATES PATENTS

| | | |
|---|---|---|
| 250,638 | Barker | Dec. 13, 1881 |
| 361,248 | Winton | Apr. 12, 1887 |
| 787,142 | Barnett | Apr. 11, 1905 |
| 1,261,438 | Reinhardt | Apr. 2, 1918 |
| 1,542,158 | Maden | June 16, 1925 |
| 2,487,944 | Pressman | Nov. 15, 1949 |
| 2,599,050 | Emerson | June 3, 1952 |
| 2,645,745 | Moreton | July 14, 1953 |
| 2,667,394 | Goetz | Jan. 26, 1954 |
| 2,697,804 | Phelon | Dec. 2, 1954 |
| 2,759,271 | Von Duyke | Aug. 21, 1956 |
| 2,862,752 | Heppner | Dec. 2, 1958 |

FOREIGN PATENTS

| | | |
|---|---|---|
| 480,769 | France | Sept. 21, 1916 |
| 75,642 | Australia | Feb. 25, 1919 |
| 445,414 | Germany | June 10, 1927 |